United States Patent [19]

Colligan

[11] Patent Number: 5,718,366
[45] Date of Patent: Feb. 17, 1998

[54] FRICTION STIR WELDING TOOL FOR WELDING VARIABLE THICKNESS WORKPIECES

[75] Inventor: Kevin James Colligan, North Bend, Wash.

[73] Assignee: The Boeing Company, Seattle, Wash.

[21] Appl. No.: 655,890

[22] Filed: May 31, 1996

[51] Int. Cl.⁶ .................................................. B23K 20/12
[52] U.S. Cl. .................. 228/112.1; 228/2.1; 156/73.5; 156/580
[58] Field of Search .................. 228/106, 112.1, 228/114, 2.1, 5.5; 156/73.5, 580, 582

[56] References Cited

U.S. PATENT DOCUMENTS

| 4,103,138 | 7/1978 | Moriki | 228/222 |
| 5,460,317 | 10/1995 | Thomas et al. | 228/112.1 |

FOREIGN PATENT DOCUMENTS

WO 93/10935 6/1993 WIPO.
WO 95/26254 10/1995 WIPO.

OTHER PUBLICATIONS

Abstracts and Exemplary Claims of U.S. Patents, pp. 6–14, for: Patent No. 5,469,617; Patent No. 5,460,317, Patent No. 5,262,123 Patent No. 4,811,887 Patent No. 4,605,151 Patent No. 3,460,235 Patent No. 5,170,031 Patent No. 4,959,241.

*Primary Examiner*—Samuel M. Heinrich
*Attorney, Agent, or Firm*—Christensen O'Connor Johnson & Kindness

[57] ABSTRACT

A friction stir welding tool for welding workpieces of variable thickness. The tool is characterized in that the displacement between a shoulder that presses down on an upper surface of the weld, and a tip of a rotating pin that penetrates and softens the workpiece to form the weld, is variable. In one embodiment, when the tool is used in conjunction with an apparatus that allows the shoulder of the tool to ride on and track the workpiece surface, the shoulder is stationary relative to the tool body, and the pin reciprocates relative to the shoulder to maintain contact with the backing plate, thereby providing a weld throughout the workpiece. In another embodiment, when the tool is used on an apparatus that holds the tool in fixed relationship to a backing plate on which the workpiece is held, the shoulder is able to reciprocate relative to the tool, following the upper surface contours of the workpiece, while the pin is able to penetrate through to the rear side of the workpiece to produce a uniform weld.

20 Claims, 6 Drawing Sheets (Prior Art)

Fig. 1A.

(Prior Art)

FRICTION STIR WELDING TOOL FOR WELDING VARIABLE THICKNESS WORKPIECES

FIELD OF THE INVENTION

The invention relates to a friction welding tool, and more particularly to a welding tool that is able to weld a workpiece of varying thickness while still providing a weld that extends throughout the thickness of the workpiece being welded.

BACKGROUND OF THE INVENTION

Figure 1A:
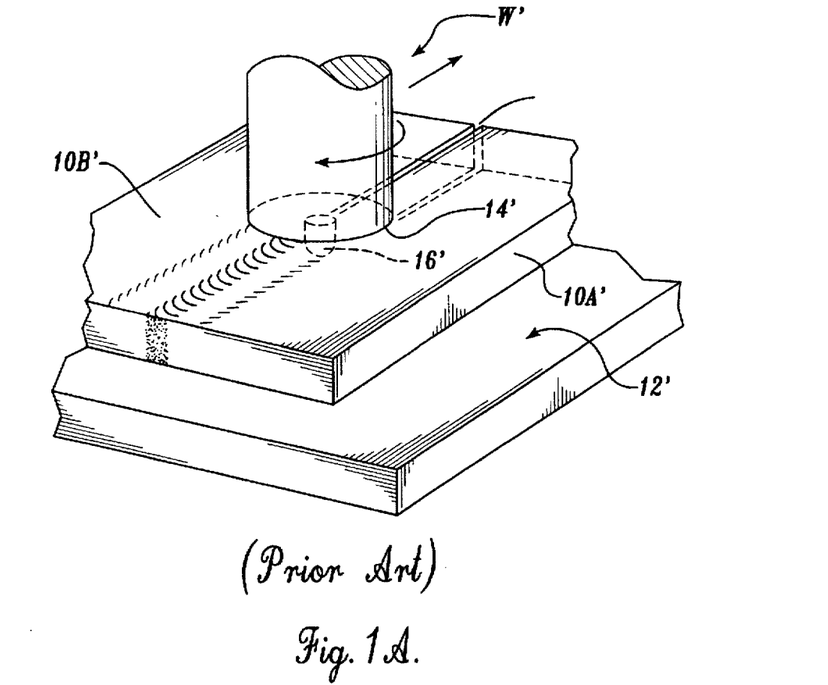
FIG. 1A is a schematic diagram of a prior art friction stir welding apparatus.
Figure 1B:
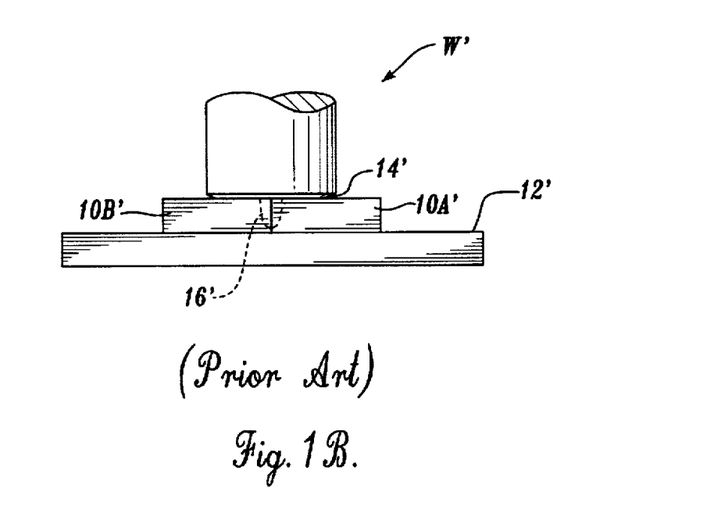
FIG. 1B is a schematic end view showing a prior art friction stir welding apparatus.

Friction stir welding (FSW) is a relatively new welding process for joining together workpieces of materials such as metals and plastics. A detailed description of the FSW apparatus and process may be found in Patent Publication WO93/10935; U.S. Pat. No. 5,460,317; and patent publication WO95/26254, all of which are hereby fully incorporated by reference. One of the useful apparatus for FSW is shown in FIGS. 1A and B. As shown in FIG. 1A, two workpieces exemplified by plates, 10A', and 10B', are aligned so that edges of the plates to be welded together are held in direct contact on a backing plate 12'. An FSW tool W' has a shoulder 14' at its distal end, and a non-consumable welding pin 16' extending downward centrally from the shoulder. As the rotating tool W' is brought into contact with the interface between plates 10B' and 10A', the pin 16' is forced into contact with the material of both plates, as shown. The rotation of the pin in the material produces a large amount of frictional heating of both the welding tool pin and at the plate interface. This heat tends to soften the material of the plates in the vicinity of the rotating pin, causing commingling of material from the two plates to form a weld. The tool is moved longitudinally along the interface between plates 10A' and 10B', thereby forming an elongate weld all along the interface between the plates. The welding tool's shoulder 14' prevents softened material from the plates from escaping upwards and forces the material into the weld joint. When the weld is completed, the welding tool is retracted.

There are two types of FSW apparatus used to drive the FSW tool along the weld path. These two types differ in the control mechanism for positioning the FSW tool vertically along its axis as the length of the weld is traversed. The first technique uses a conventional milling machine used in the metalworking trade. The vertical axis on this type of machine is driven along a predetermined path, as is the longitudinal and transverse axes. This type of machine is particularly suited to maintaining a fixed gap between the distal end of the pin 16' and the surface of the backing plate 12'. The second type of FSW apparatus controls its vertical axis by pressing down along the vertical axis until a predetermined force is reached. This type of "constant vertical force" machine is particularly suited to maintaining a precise contact between the FSW tool shoulder 14' and the upper surface of the material to be welded 10'.

In order to produce a sound weld it is necessary to simultaneously maintain a precise contact area between the shoulder 14' and the surface of the material 10' while driving the distal end of the pin 16' very close to the backing plate 12'. These two conditions ensure that there is sufficient frictional heating to soften the workpiece material and that the material is welded through the full thickness of the plate. However, present FSW tools make it impossible for either type of FSW apparatus mentioned above to simultaneously satisfy these two requirements. Problems arise when the material to be welded varies in thickness, either by design or by variability in its manufacture.

In present FSW tools the pin 16' is held in a fixed position relative to the shoulder 14'. Both are either machined from a single piece of metal, or the pin is fixedly attached to the body of the welding tool. Therefore, if the material to be welded becomes thicker as the welding tool traverses the length of the joint it will be necessary to either lift the welding tool relative to the backplate or allow the shoulder to plow into the upper surface of the material. Maintaining a precise contact area between the shoulder and the material upper surface by lifting the welding tool results in too large a gap between the pin and the backplate and produces an unwelded region at the bottom of the weld. Conversely, maintaining a constant gap between the pin and the backplate allows the shoulder to plow into the upper surface of the plate, expelling material along the sides of the welding tool onto the surface of the plate.

If the material becomes thinner along the edge of the joint, maintaining contact between the shoulder 14' and the upper surface of the material would require that the welding tool be pushed down further. However, this would cause the pin 16' to push into the backplate 12' causing damage to the pin and the backplate. If the gap between the pin and the backplate is maintained, the thinning of the workpiece material would cause the shoulder to lose contact with the material, thus eliminating the frictional heating and resulting in a flawed weld.

There exists a need for an FSW tool that is able to weld together two workpieces that vary in thickness while still providing a weld extending through the full interface between the workpieces, without the risk of damaging the backplate on which the workpieces are supported. Moreover, the FSW tool should be of simple design, relatively inexpensive to produce, and relatively inexpensive to maintain. Preferably, the FSW tool should be usable with existing FSW apparatus through a simple retrofit procedure.

SUMMARY OF THE INVENTION

The invention provides a friction stir welding (FSW) tool that is able to effectively weld a workpiece of varying thickness so that the weld extends substantially throughout the workpiece. Moreover, the risk of the rotating tip of the FSW tool of the invention coming into forcible contact with a supporting backing plate, causing damage to either the tool or the backing plate, is significantly reduced or eliminated.

The friction stir welding tool of the invention includes a rotatable welding tool body with a shoulder at a distal end of the body. A pin extends from the distal end of the welding tool body and projects downward from a central location of the shoulder. The pin has a distal tip and the pin tip and shoulder are capable of limited vertical displacement relative to each other. Ordinarily, when not in use, the pin and shoulder are maintained at a rest displacement relative to each other by a resilient device operatively connected to the pin and the shoulder. As a result of this limited vertical displacement, of pin relative to shoulder, the pin of the tool of the invention is able to penetrate to the rear side of a workpiece being welded, while the shoulder rides on the upper surface of the workpiece, regardless of variation in thickness of the workpiece at the weld line.

In one embodiment of the FSW tool of the invention, the shoulder is fixed relative to the body of the welding tool, while the pin is able to reciprocate relative to the fixed shoulder. This embodiment of the invention is particularly useful when the FSW apparatus is of the type that constrains the shoulder to ride on the surface of the workpiece. In this embodiment, the resilient device operatively urges the pin downward relative to the shoulder. Thus, the pin extends through to the rear side of the workpiece to be welded and contact is maintained between the pin and the backing plate beneath. As a result, when the FSW tool traverses the workpiece to form the weld, and the thickness of the workpiece varies, then the shoulder rides on the upper surfaces of the workpiece while the pin reciprocates. Thus, the pin moves upward against the urging of the resilient device when the workpiece become thinner (due to increasingly forcible contact with the backing plate on its tip), and moves downward relative to the shoulder in the direction of urging (until its tip just grazes or rubs against the backing plate beneath) when the workpiece become thicker. Consequently, a uniform weld extending throughout the workpiece is produced, while the shoulder is maintained in contact with the upper surface of the workpiece, as required for the production of a good weld.

In an alternative embodiment, the shoulder is able to reciprocate relative to the welding tool body, and the pin is held fixedly relative to the welding tool body. In this embodiment, suitable for use with FSW apparatus, such as a conventional milling machine, that maintain a constant small clearance gap between the pin tip and the backing plate, the reciprocable shoulder of the welding tool tracks the upper surface of the workpiece being welded. As the thickness of the workpiece increases, the shoulder moves upward against the urging of the resilient device; and the shoulder moves downward as the workpiece become thinner under the urging of the resilient device. The riding of the shoulder on the upper surface of the workpiece generates frictional heating and provides a seal above the weld being formed by the rotating pin, preventing the softened material from escaping. The pin extends through to the rear side of the workpiece throughout the procedure, preferably as close to the backing plate as possible, to assure weld root closure. This embodiment has the added benefit of eliminating the "pin hole" formed at the end of a weld when the pin is removed from the workpiece provided that continuous forward motion is maintained as the tool is retracted. Thus, since the pin continues to rotate, and the shoulder continues to ride on the workpiece surface as the pin is withdrawn from the weld, the "pin hole" is sealed. This feature is especially useful in welding tanks or other sealed containers or structures.

The invention also provides a method of friction stir welding materials together. The method includes forming a weld using a rotating pin to soften workpiece material, and a shoulder, proximal to the pin, to maintain the softened workpiece material in place. During the forming of the weld, while the welding tool traverses the workpiece being welded, the method of the invention automatically and resiliently varies the displacement between a tip of the rotating pin and the shoulder to maintain penetration of the pin throughout the thickness of the workpiece, preferably through to the backing plate. Thus, the distance, if any, between the backing plate and the tip of the rotating pin is substantially invariant, regardless of the thickness of the workpiece.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, not to scale and schematic in the sense of illustrating features of the invention (or prior art in the case of FIGS. 1A, B and C) wherein.

DETAILED DESCRIPTION OF THE PREFERRED EMBODIMENT

The invention provides a friction stir welding (FSW) tool that is significantly more flexible in its capability to weld a workpiece, of varying thickness than prior art tools. The FSW tool of the invention achieves this flexibility by permitting vertical displacement of the tip of the tool relative to a shoulder surrounding the tip. Moreover, the pin and shoulder are urged to a rest displacement relative to each other by a resilient device operatively connected to each. The terms "operatively connected" and "operatively urging" mean that the connection or urging need not be through direct contact and include indirect connection or urging.

The invention provides a FSW tool that includes a rotatable pin that has a distal tip, and a shoulder that at least partially surrounds a proximal portion of the pin. A resilient device is in operative urging communication with the pin and the shoulder so that a displacement between the tip of the pin and the shoulder is variable from a rest displacement, when the resilient device has least potential energy. Thus, the invention has several physical embodiments, the preferred of which are illustrated in the appended drawings. Clearly, other embodiments applying the principle of limited vertical displacement of pin relative to shoulder are also possible and are encompassed in the invention and the claims attached hereto.

Figure 2A:
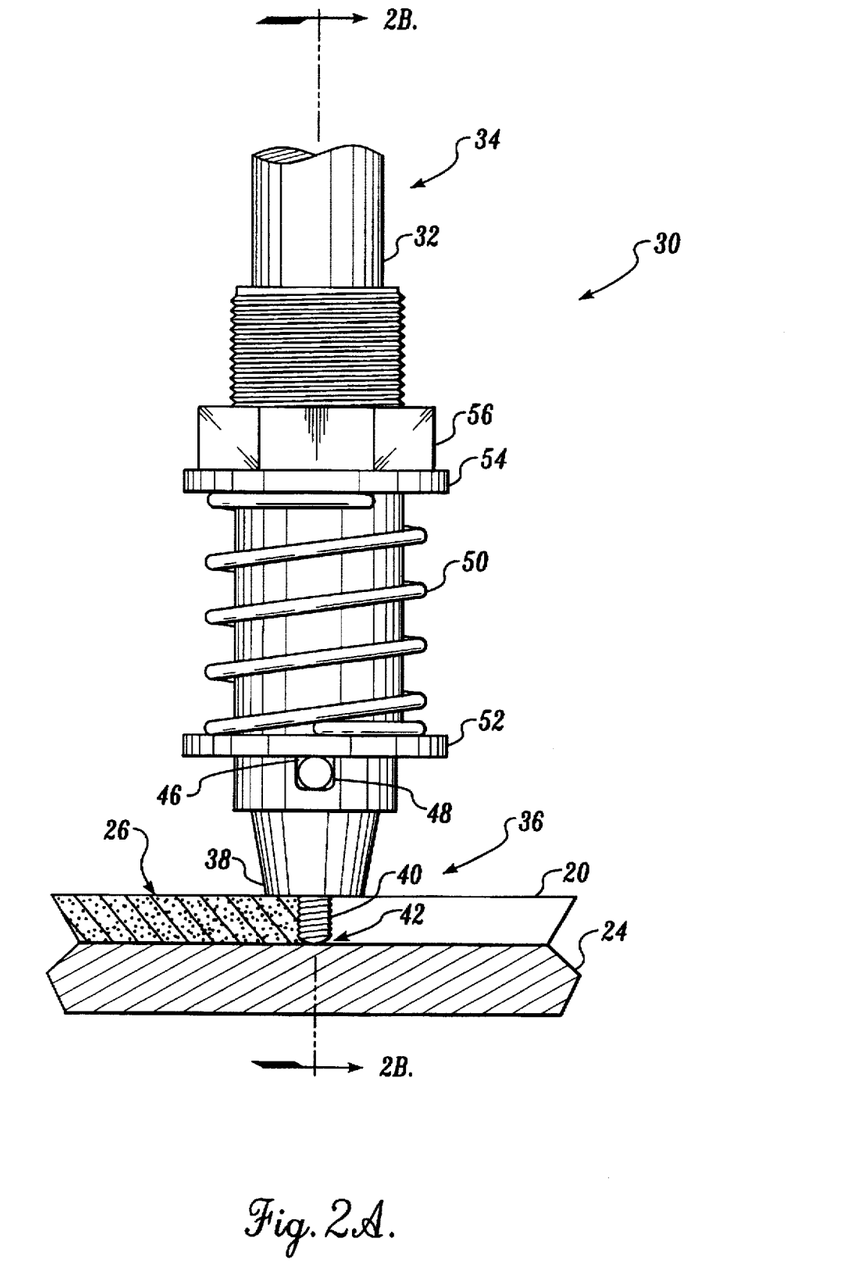
FIG. 2A is a schematic side view, in partial cross-section, showing a friction stir welding apparatus of the invention.
Figure 2B:
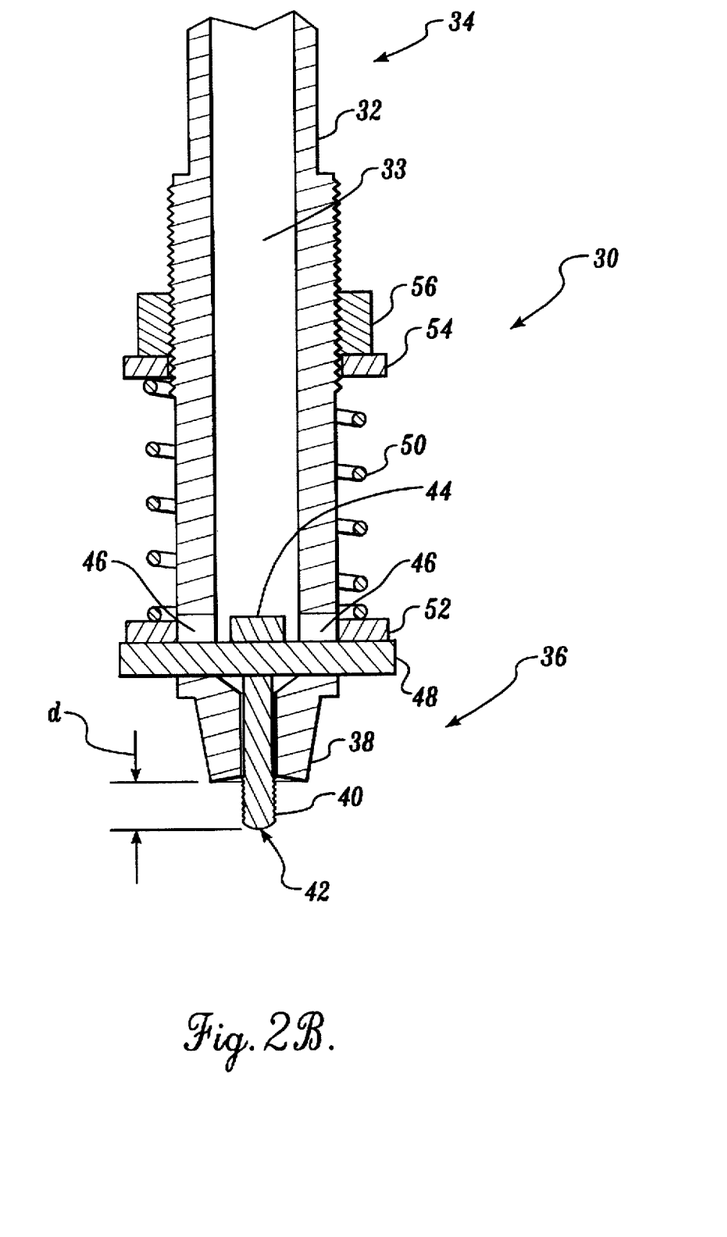
FIG. 2B is a schematic cross-sectional view of the friction stir welding apparatus of FIG. 2A.
Figure 2C:
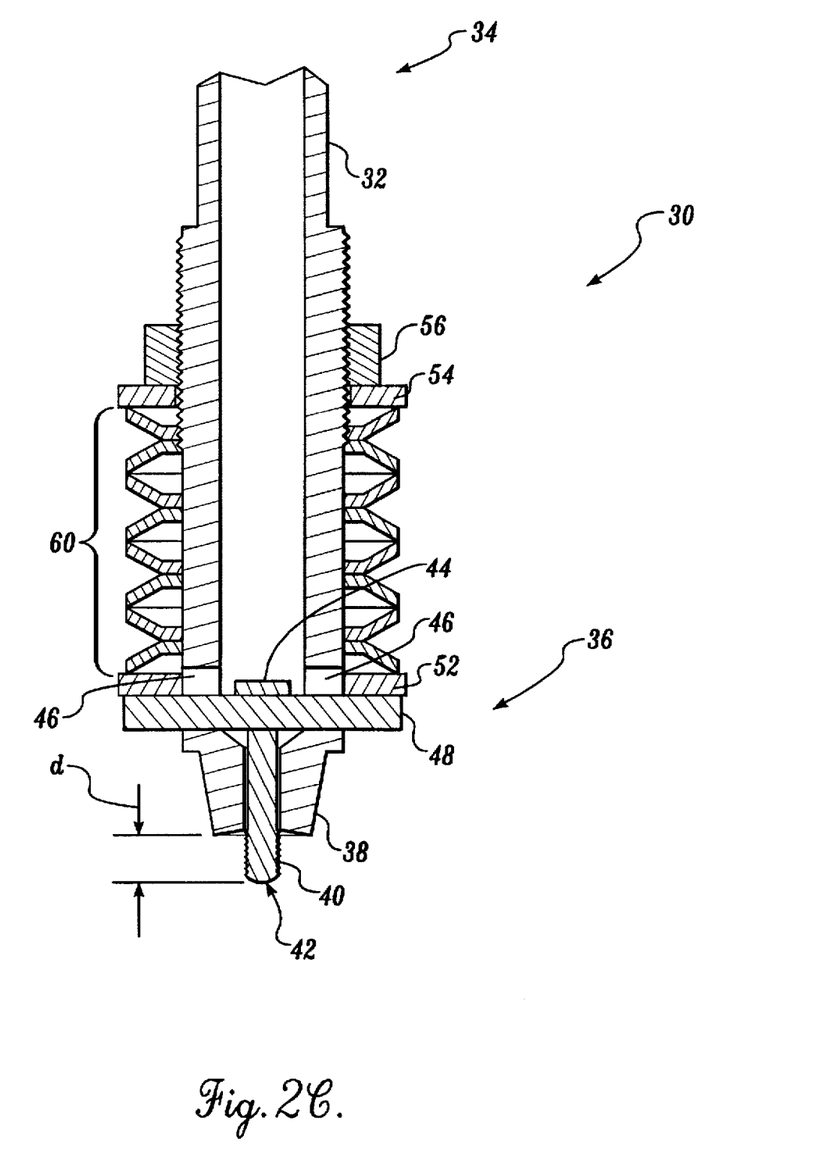
FIG. 2C is a schematic cross-sectional view of another embodiment of a friction stir welding apparatus of the invention.

In one of the embodiments of the invention, shown in FIGS. 2A, 2B and 2C, the pin and shoulder are urged to a "rest displacement" relative to each other by a resilient device, and the displacement varies against the urging force when the tool is in use. In this embodiment, the shoulder is stationary relative to the tool body, and may be integral with the tool body. The pin, on the other hand, reciprocates relative to the shoulder, and the tool body. This embodiment of the invention is useful in a "constant vertical force" FSW apparatus where the FSW tool tracks the surface of the workpiece so that the shoulder rides on the workpiece surface. Thus, using prior art tools, the shoulder would ride on the upper surface of the workpiece, but the pin would fail to penetrate to the rear side of the workpiece when the thickness of the workpiece increases; and might forcibly strike the backing plate when the workpiece becomes thinner. As will be explained below, the embodiment of FIGS. 2A, 2B and 2C substantially overcomes this deficiency in the prior art and the pin penetrates the workpiece through to the rear side without damage to the backing plate, regardless of variation in workpiece thickness.

FIG. 2A shows a preferred FSW tool 30 of the invention and a cross-section at the weld that is being formed. The tool 30 has a tool body 32, in this case substantially cylindrical, that extends vertically downward when coupled to a drive apparatus that rotates the tool (not shown) to a distal end 36. A proximal shank 34 of the tool is adapted for coupling to the drive mechanism (not shown) for rotating the tool at a controlled speed. The distal end 36 of the tool includes a shoulder 38 with a pin 40 extending downwardly through its center. This is more clearly shown in FIG. 2B, a cross-sectional view of the FSW tool of FIG. 2A. In general, the pin 40 of tool 30 is inserted into the workpiece to perform the welding operation. As shown in FIG. 2A, the workpiece rests on a backing plate 24 so that the tip 42 of the rotating pin 40 barely grazes or rubs the backing plate 24 as the tool 30 creates the weld 26.

Referring to FIG. 2B, illustrating the embodiment of the invention wherein the pin 40 is able to reciprocate relative to the shoulder 38, the shoulder 38 is integrally formed with the tool body 32. However, such integral formation is not essential, and the shoulder may be a separate portion, fixedly mounted to the distal end 36 of the tool to form part of the tool body 32. In this instance, the tool body 32 has a central bore 33. Importantly, the tool body 32 includes a vertical slot 46 extending horizontally through the body 32 and located above the shoulder 38 for reciprocably mounting the pin 40 to the tool 30. The pin extends through a central bore in the distal end of the shoulder, into the central bore 33 of the tool body. The pin has a horizontal bore through its head 44 and is mounted to the tool body 32 by a crossbar 48 that extends through the slot 46 and the horizontal bore of the pin head. Thus, the pin is able to move upward and downward between the upper and lower ends of the vertical slot 46, i.e., the pin is able to reciprocate to a limited extent relative to the tool 30, and to the shoulder 38.

In order to urge the tip 42 of the pin 40 to a "rest displacement" relative to the shoulder 38, the pin is urged to a "rest position" where the crossbar is in contact with the lower edge of the slot 46. The distance between the pin tip 42 and the shoulder 38 is the "rest displacement" between pin and shoulder. The urging is provided by a resilient device, in this instance a coiled compression spring 50, that encircles the tool body 32 and operatively urges the pin 40 downward while operatively urging upward against the tool body. This is achieved, in the embodiment shown, by compressing the spring 50 to a predetermined compressive force between a distal washer 52 that rests on the crossbar 48, and a proximal washer 54 interposed between the proximal end of the spring 50 and a preload nut 56 thread-edly engaging the shank 35 of the tool. Adjustment of the preload nut 56 adjusts the potential energy and hence the compressive force exercised by the spring 50. The rest position corresponds to a condition of least potential energy of the resilient device, as does the rest displacement.

FIG. 2C shows an alternative embodiment of the reciprocating pin embodiment of the FSW tool of the invention. In this embodiment, the resilient device is a series of Belleville washers 60, also interposed between the preload nut 56 and the crossbar 48, to operatively urge the movable pin 40 downward relative to the tool body 32, and the shoulder 38. Thus, the pin, in its rest position, is aligned with the crossbar touching the lowest extremity of slot 46. The displacement between the pin and shoulder clearly varies as the pin reciprocates in the tool when the tool is in use.

Figure 3A:
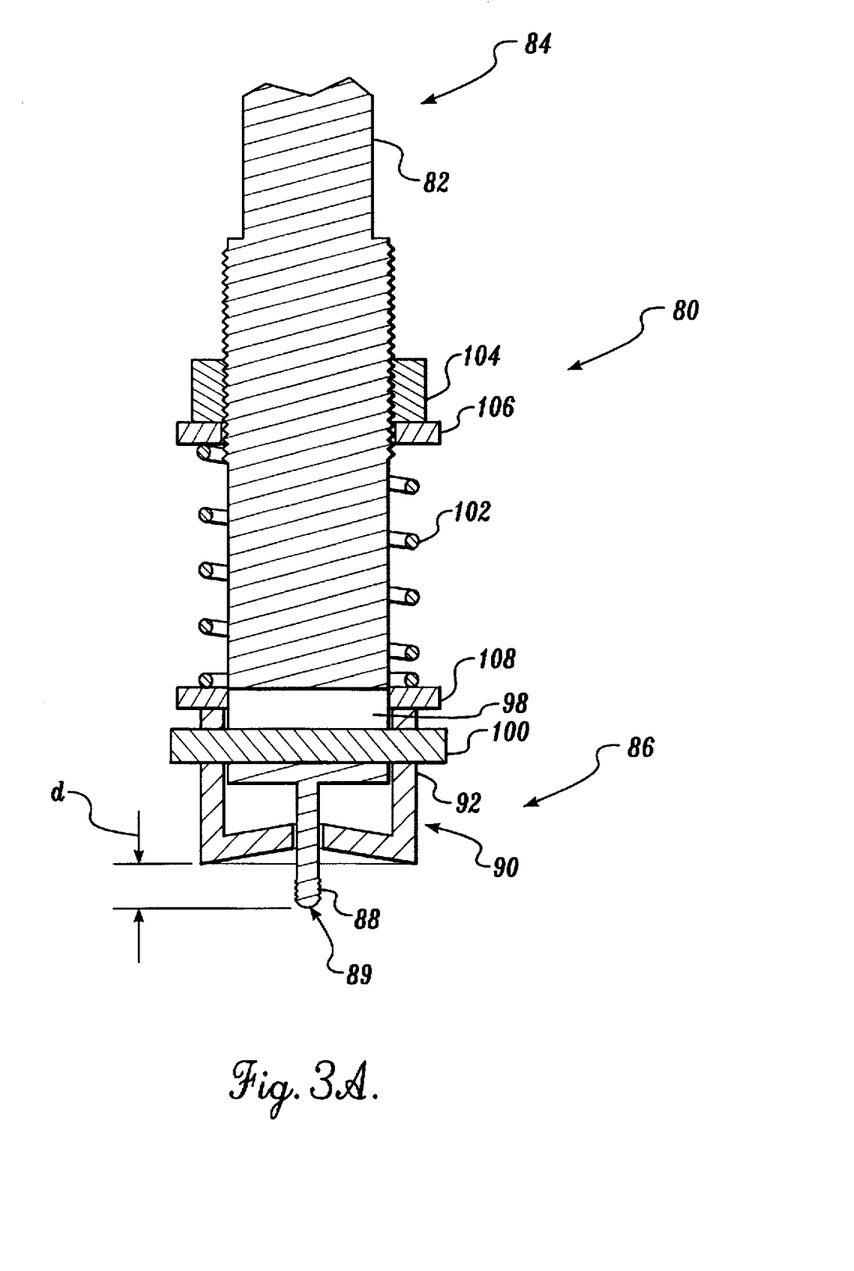
FIG. 3A is a schematic cross-sectional view of another embodiment of a friction stir welding apparatus in accordance with the invention.
Figure 3B:
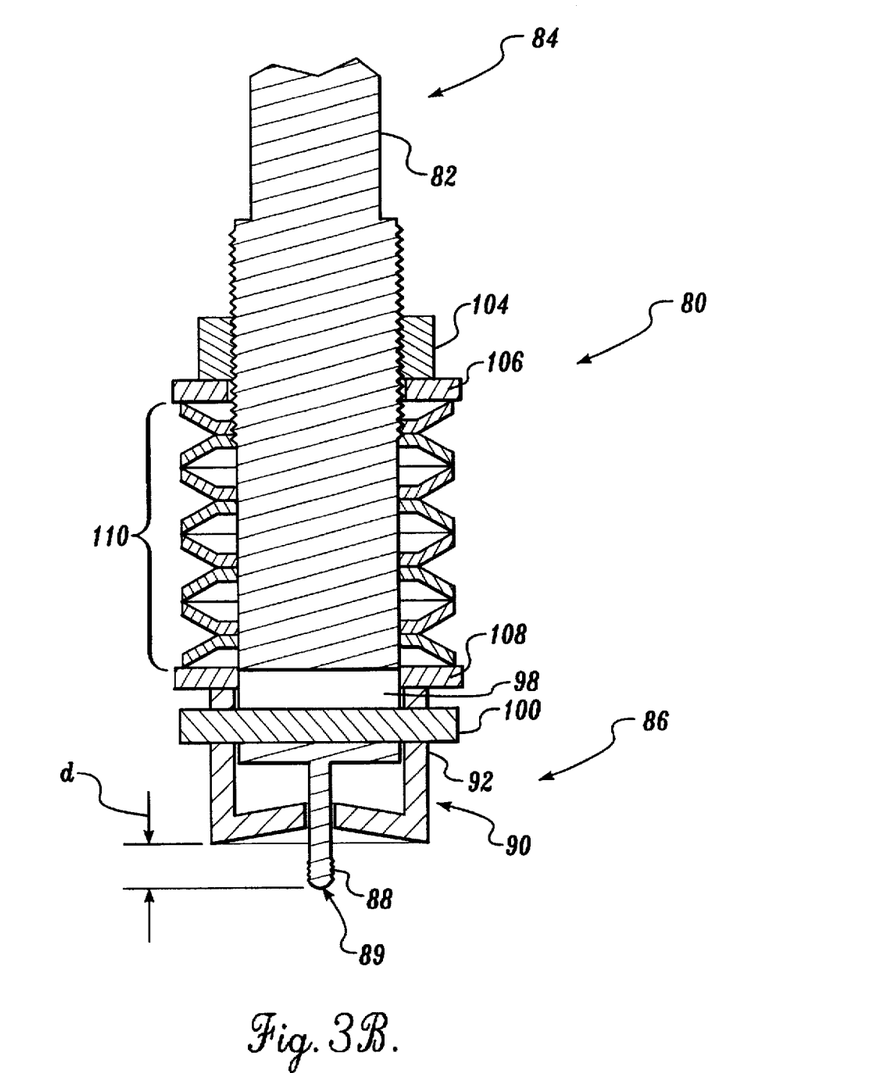
FIG. 3B is a schematic cross-sectional view of another embodiment of a frictional stir welding tool of the invention.

In the alternative embodiment of the invention, shown in FIGS. 3A and 3B, the pin and shoulder are also usually maintained at a rest displacement d relative to each other, and the displacement varies when the tool is in use. However, in this embodiment, the pin is stationary relative to the tool body, while the shoulder is able to reciprocate relative to the tool body. This embodiment of the FSW of the invention is useful in conventional milling machines where the pin is maintained a constant clearance from the backplate supporting the workpiece. The shoulder of the FSW tool of the invention reciprocates to maintain close contact with the surface of the workpiece being welded. Thus, during this welding process, the reciprocable shoulder rides along the upper surface of the workpiece providing frictional heating and weld containment, while the pin penetrates the workpiece and is maintained at a constant small displacement from (or barely in rubbing contact with) the backing plate.

As shown in FIG. 3A, the tool 80 has a substantially cylindrical tool body 82 that includes a proximal end 84 and a distal end 86. A pin 88 extends downward from the center of the distal end and terminates in a tip 89. As shown, the pin 88 is integrally formed with the tool body 82, although other embodiments, wherein the pin is fixedly mounted to the tool body are also useful. A movable shoulder 90 is reciprocably mounted to the distal end of the tool body 82. In this embodiment, reciprocable mounting is achieved by providing a vertical slot 98, that extends horizontally through the distal end 86 of the tool body 82. The shoulder 90 has a vertical collar 92 extending at least partially around its circular periphery. Thus, when the shoulder 90 is fitted to the distal end 86 of the tool body 82, with the collar 92 surrounding the distal end of the tool body, a horizontal crossbar 100 extends through opposing bores in the collar 92 of the movable shoulder 90 and the horizontally extending vertical slot 98. Thus, the crossbar 100 is snugly held in the bores of the collar but is able to reciprocate, to a limited extent, in the vertical slot 98 so that the shoulder 90 is able to move relative to the tip 89 of the pin 88. When the crossbar rests on the lowest extremity of the slot 98, the shoulder 90 is at a rest displacement relative to the pin tip 89. A resilient device, in this exemplary embodiment, in the form of compression coil spring 102, is provided to urge the movable shoulder 90 downward relative to the tool body 82 to maintain the rest displacement between shoulder 90 and pin tip 89. As explained above, when workpiece materials thicken, the movable shoulder is urged upward to maintain tight contact with the upper surfaces of material being welded so that the displacement between the shoulder and pin varies from the rest displacement.

The resilient device, shown in FIG. 3A as helical compression spring 102, is coiled around the tool body 82 with a distal end operatively urging the movable shoulder downward, and an upper end abutting against a preload nut 104 that is threaded onto a threaded section of the tool body 82 vertically spaced from the shoulder 90. Optionally a proximal washer 106 is interposed between the upper end of the spring 102 and the nut 104; and a distal washer 108 is interposed between the distal end of the spring 102 and the shoulder 90. Reciprocal movement of the preload nut 104 adjusts the potential energy, and hence the compressive force, applied by the compression spring 102.

In the alternative embodiment, illustrated in FIG. 3B, the resilient device is a series of Belleville washers 110. As before, these washers are arranged between the upper surface of the movable shoulder 90 and the under surface of the preload nut 104 so that reciprocal movement of the preload nut adjusts the degree of compressive force exerted by the washers on the shoulder 90. Optionally, proximal 106 and distal 108 washers are interposed between the Belleville washer and the preload nut 104, and the shoulder 90, respectively.

In most preferred embodiments of the invention, the rotatable pin of the FSW tool has a grooved surface, such as a helical screw thread. It has been found that this type of surface enhances the formation of a sound weld. Moreover, the shoulder of the FSW tool of the invention is preferably peaked inward and upward towards its center, at an angle of about ten degrees from the outer periphery of the shoulder. This shape of shoulder is an improvement over flat or non-peaked shoulders and allows the production of a better weld. Nevertheless, the FSW tools of the invention are useful even without the grooved pin and/or the peaked shoulder.

The invention also provides a method of friction stir welding materials together. The method includes forming a weld using a rotating pin to soften workpiece material, and a shoulder, proximal to the pin, to maintain the softened workpiece material in place. During the forming of the weld, while the welding tool traverses the workpiece being welded, the method of the invention automatically and resiliently varies the displacement between a tip of the rotating pin and the shoulder to maintain penetration of the pin throughout the thickness of the workpiece, through to the backing plate. Thus, the distance between the backing plate and the tip of the rotating pin is substantially invariant, regardless of the thickness of the workpiece.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, any means-plus-function clauses are intended to cover the structures described herein as performing the recited function, and not only structural equivalents, but also equivalent structures. Thus, although a nail and a screw may not be structural equivalents in that a nail employs a cylindrical surface to secure wooden workpieces together, whereas a screw employs a helical surface, in the environment of fastening wooden workpieces, a nail and a screw may nevertheless be equivalent structures.

The embodiments of the invention in which an exclusive property or privilege is claimed are defined as follows:

1. A friction stir welding tool comprising:
   (a) a rotatable welding tool body,
   (b) a shoulder at a distal end of the welding tool body;
   (c) a pin extending downward from the distal end of the welding tool body, beyond the shoulder, the pin and shoulder capable of limited vertical displacement relative to each other; and
   (d) a resilient device urging the pin and the shoulder to a rest displacement relative to each other.

2. The tool of claim 1, wherein the pin is reciprocably mounted to the welding tool so that the pin is capable of limited reciprocation relative to the welding tool body.

3. The tool of claim 2, wherein the resilient device urges the pin downward, relative to the shoulder, to a pin rest position.

4. The tool of claim 1, wherein the shoulder is reciprocably mounted to the welding tool body.

5. The tool of claim 4, wherein the resilient device urges the shoulder downward, relative to the tool body, to a shoulder rest position.

6. The tool of claim 4, wherein the pin is integral with the distal end of the welding tool body.

7. The tool of claim 4, wherein the welding tool body comprises a vertical slot near the distal end of the body; and the shoulder comprises:
   (a) a collar sized to cooperate with the distal end of the tool body, the collar having a pair of opposed bores
   (b) a central bore through a base of the shoulder sized to receive the pin; and
   (c) a crossbar extending through the opposed bores of the collar and the vertical slot of the body to mount the shoulder portion to said body.

8. The tool of claim 7, wherein the resilient device comprises a compressed coil spring having a proximal end operatively urging upward against the welding tool body, and a distal end operatively urging the shoulder portion downward.

9. The tool of claim 7, wherein the resilient device comprises a series of Belleville washers, a proximal one of the washers operatively urging upward against the welding tool body and a distal one of the washers operatively urging the shoulder portion downward.

10. The tool of claim 1, wherein the tool body comprises a vertical slot near the distal end of the tool body, and the pin comprises a horizontal bar, the bar extending through the vertical slot to mount the pin reciprocably to the distal end of the welding tool body.

11. The tool of claim 10, wherein the resilient device comprises a compressed coil spring having a proximal end operatively urging upward against the welding tool body, and a distal end operatively urging the bar downward to a rest position in the slot.

12. The tool of claim 10, wherein the resilient device comprises a series of stacked Belleville washers, the washers having a proximal one operatively urging the welding tool body upward, and a distal one operatively urging the bar of the pin downward to a rest position in the slot.

13. A friction stir welding tool comprising:
   (a) a rotatable pin having a distal tip;
   (b) a shoulder at least partially surrounding a proximal portion of the pin; and
   (c) a resilient device in operative urging communication with the pin and the shoulder.
   wherein a displacement between the tip of the pin and the shoulder is variable from a rest displacement when the resilient device has least potential energy.

14. The tool of claim 13, wherein the pin is fixedly mounted to a body of the welding tool; and the shoulder is reciprocably mounted to the tool.

15. The tool of claim 14, wherein the pin is integral with a body of the welding tool; and extends through a bore in the shoulder.

16. The tool of claim 14, wherein the shoulder is integral with a body of the tool; and the pin is reciprocably mounted to the tool.

17. A method of friction stir welding workpieces having variable thickness, the method comprising:
   (a) forming a weld using a rotating pin to soften workpiece material and a rotating proximal shoulder to maintain the softened workpiece material in place; and
   (b) while forming the weld, automatically and resiliently varying a displacement between a tip of the rotating pin and the shoulder to maintain penetration of the pin throughout a thickness of the workpiece material, as the thickness of the workpiece material varies.

18. The method of claim 17, wherein the forming of the weld includes forming with a pin having a helically threaded surface.

19. The method of claim 17, wherein the forming of the weld includes forming with a shoulder having a peaked base.

20. The method of claim 17, wherein the resiliently varying of the displacement includes varying from a rest displacement by increasing the potential energy of a resilient device operatively connected to the pin and the shoulder.

* * * * *

UNITED STATES PATENT AND TRADEMARK OFFICE
CERTIFICATE OF CORRECTION

PATENT NO. : 5,718,366
DATED : February 17, 1998
INVENTOR(S) : K.J. Colligan

It is certified that error appears in the above-identified patent and that said Letters Patent is hereby corrected as shown below:

On the title page:Item

[56]   Refs.Cited    Please insert the following references:
       (U.S. Pat.
       Docs)         --2,779,998   2/1957   Bailey . . . 228/114
                     4,144,110    3/1979   Luc . . . 228/12.1
                     5,611,479    3/1997   Rosen . . . 228/112.1--

[56]   Refs.Cited    Please insert the following references:
       (Foreign
       Pat. Docs)    --1.341.915   9/1963   France . . . 156/73.5
                     26 56 017    6/1978   Germany . . . 156/73.5--

Signed and Sealed this

Twenty-sixth Day of May, 1998

Attest:

BRUCE LEHMAN

*Attesting Officer*          *Commissioner of Patents and Trademarks*